US009336619B2

(12) United States Patent
Kim et al.

(10) Patent No.: US 9,336,619 B2
(45) Date of Patent: May 10, 2016

(54) METHOD AND APPARATUS FOR GENERATING PHOTOGRAPH IMAGE

(71) Applicant: Samsung Electronics Co., Ltd, Gyeonggi-do (KR)

(72) Inventors: Pyo-Jae Kim, Seoul (KR); Jae-Sik Sohn, Gyeonggi-do (KR); Ki-Huk Lee, Gyeonggi-do (KR); Young-Kwon Yoon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 261 days.

(21) Appl. No.: 14/037,208

(22) Filed: Sep. 25, 2013

(65) Prior Publication Data

US 2014/0086505 A1   Mar. 27, 2014

(30) Foreign Application Priority Data

Sep. 25, 2012   (KR) .................. 10-2012-0106815

(51) Int. Cl.
*G06K 9/40* (2006.01)
*G06T 11/60* (2006.01)
*H04N 5/232* (2006.01)
*H04N 5/235* (2006.01)

(52) U.S. Cl.
CPC .............. *G06T 11/60* (2013.01); *H04N 5/2351* (2013.01); *H04N 5/2356* (2013.01); *H04N 5/23229* (2013.01); *H04N 5/2353* (2013.01); *H04N 5/23232* (2013.01)

(58) Field of Classification Search
CPC .............. G06T 11/60; H04N 5/23229; H04N 5/23232; H04N 5/2351; H04N 5/2353; H04N 5/2356
See application file for complete search history.

(56) References Cited

U.S. PATENT DOCUMENTS

| 7,856,174 | B2 | 12/2010 | Tanaka et al. |
| 7,952,615 | B2 | 5/2011 | Lee |
| 8,446,481 | B1 * | 5/2013 | Geiss .................. 348/221.1 |
| 2005/0219391 | A1 | 10/2005 | Sun et al. |
| 2007/0258707 | A1 * | 11/2007 | Raskar ................ 396/52 |
| 2009/0154821 | A1 | 6/2009 | Sorek et al. |
| 2009/0244318 | A1 * | 10/2009 | Makii .................. 348/229.1 |

(Continued)

FOREIGN PATENT DOCUMENTS

| JP | 2008-104009 | 5/2008 |
| JP | 2009-049575 | 3/2009 |

(Continued)

OTHER PUBLICATIONS

International Search Report dated Dec. 26, 2013 in connection with International Patent Application No. PCT/KR2013/008518, 3 pages.

(Continued)

*Primary Examiner* — Phuoc Tran

(57) ABSTRACT

The present disclosure relates to a method and an apparatus for generating a photograph image. The method includes: measuring an illumination value, acquiring a plurality of source images used to generate one final image, generating a set final image either by selecting one source image with best quality among the plurality of acquired source images, or by combining the plurality of acquired source images, based on the measured illumination value. The present disclosure allows to acquire a clear and bright photograph image in a low-light environment.

24 Claims, 6 Drawing Sheets

(56) References Cited

U.S. PATENT DOCUMENTS

| | | | | |
|---|---|---|---|---|
| 2011/0157362 | A1* | 6/2011 | Krokel | 348/148 |
| 2012/0274822 | A1* | 11/2012 | Smith et al. | 348/302 |

FOREIGN PATENT DOCUMENTS

| | | |
|---|---|---|
| JP | 2009-077204 | 4/2009 |
| KR | 10-0819809 | 4/2008 |
| KR | 10-2009-0027480 | 3/2009 |
| KR | 10-1023946 | 3/2011 |
| KR | 10-2011-0067700 | 6/2011 |

OTHER PUBLICATIONS

Written Opinion of the International Searching Authority dated Dec. 26, 2013 in connection with International Patent Application No. PCT/KR2013/008518, 4 pages.

* cited by examiner

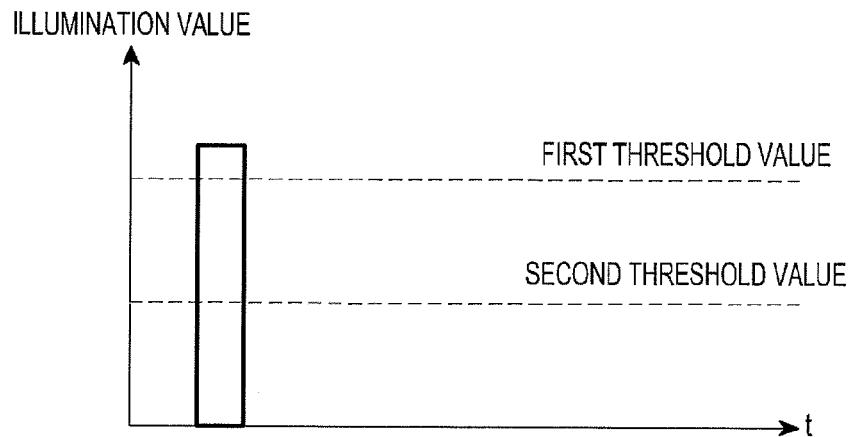
FIG.3A
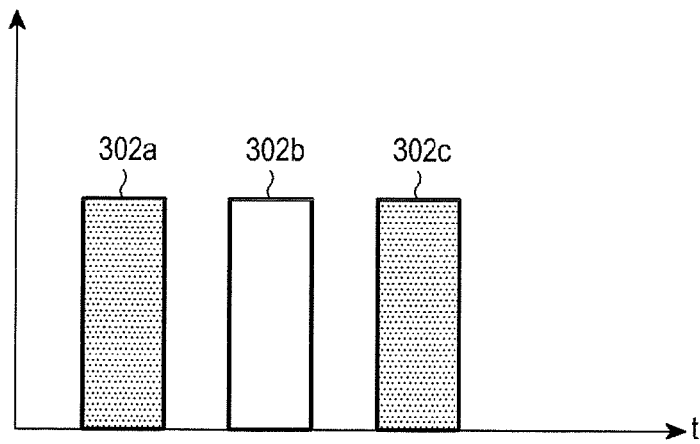
FIG.3B
| ILLUMINATION VALUE | NUMBER OF SOURCE IMAGE | GAIN OF IMAGE SENSOR | EXPOSURE TIME |
|---|---|---|---|
| 0~5 | 6 | 3200 | 0.1 |
| 5~10 | 6 | 1600 | 0.2 |
| 10~15 | 3 | 400 | 0.3 |
| 15~20 | 2 | 200 | 0.4 |
FIG.4

METHOD AND APPARATUS FOR GENERATING PHOTOGRAPH IMAGE

CROSS-REFERENCE TO RELATED APPLICATION(S) AND CLAIM OF PRIORITY

The present application is related to and claims the priority under 35 U.S.C. §119(a) to Korean Application Serial No. 10-2012-0106815 filed in the Korean Intellectual Property Office on Sep. 25, 2012, the entire content of which is hereby incorporated by reference.

TECHNICAL FIELD

The present disclosure relates to a method and an apparatus for generating a photograph image.

BACKGROUND

When photographing is performed in a low illumination environment, a dark photograph image is generated and it is thus difficult to perceive the photographed object. In the prior art, a method of manually or automatically increasing an exposure time or increasing a gain of an image sensor in order to generate a photograph image having a similar brightness to a standard brightness in a low illumination environment has been used.

The method of increasing the exposure time causes a blur due to a wobbling of a camera or a subject movement so that a quality of the photograph image is deteriorated. Meanwhile, the method of increasing, the gain of the image sensor increases not only the incidence light but also a noise generated by the image sensor itself, which also causes the quality deterioration of the photograph image.

Therefore, a scheme for acquiring a clear and bright photograph image in a low illumination environment is required.

SUMMARY

To address the above-discussed deficiencies of the prior art, it is a primary object to provide a scheme for acquiring a clear photograph image.

In addition, another aspect of the present disclosure is to provide a scheme for acquiring a clear photograph image even when the gain of an image sensor is raised.

Further, another aspect of the present disclosure is to provide a scheme for acquiring a clear and bright photograph image in a low illumination environment.

A method of generating a photograph image according to an embodiment of the present disclosure includes measuring an illumination value, acquiring a plurality of source images used to generate one final image, and generating a set final image either by selecting one source image with best quality among the plurality of acquired source images, or by combining the plurality of acquired source images, based on the measured illumination value.

Meanwhile, an apparatus for generating a photograph image according to an embodiment of the present disclosure includes an illumination measuring unit configured to measure an illumination value, an image acquisition unit configured to acquire a plurality of source images used to generate one final image and a controller is configured to generate a set final image either by selecting one source image with best quality among the plurality of acquired source images, or by combining the plurality of acquired source images, based on the measured illumination value.

Meanwhile, in a readable record medium according to an embodiment of the present disclosure, programs for measuring an illumination value acquiring a plurality of source images used to generate one final image, generating a set final image either by selecting one source image with best quality among the plurality of acquired source images, or by combining the plurality of acquired source images, based on the measured illumination value.

According to the present disclosure, it is possible to acquire a clear and bright photograph image in a low illumination environment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A to 7 are views illustrating examples of a method of generating a photograph image according to embodiments of the present disclosure.

DETAILED DESCRIPTION OF THE DISCLOSURE

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, in the following description of the present disclosure, a detailed description of known functions and configurations incorporated herein will be omitted when it may make the subject matter of the present disclosure rather unclear.

As described above, a conventional method, which increases the exposure time in order to acquire a photograph image having a brightness similar to a standard brightness in a low illumination environment, has a problem in that wobbling of a camera degrades the image quality. Further, a conventional method, which increases the gain of an image sensor, has a problem in that an increase of noise generated by an image sensor itself degrades the image quality.

Accordingly, the present disclosure provides a scheme of generating a photograph image having a brightness similar to a standard brightness without any quality deterioration.

Hereinafter, embodiments of the present disclosure will be described with reference to the related drawings.

Figure 1:
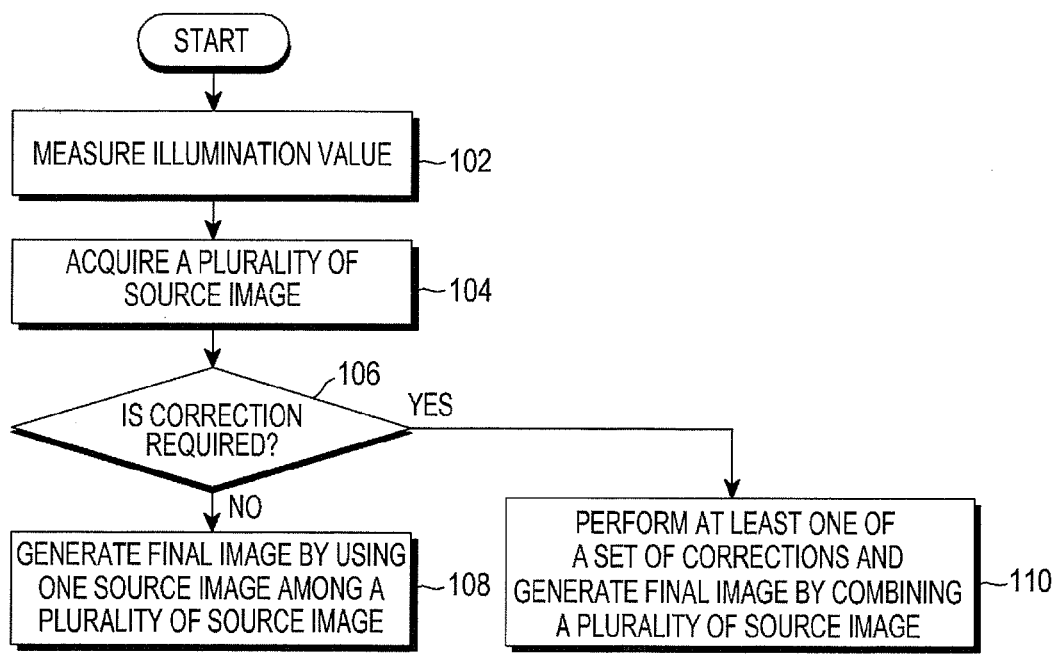
FIG. 1 a flowchart illustrating an example of a concept of a method of generating a photograph image according to embodiments of the present disclosure.

First, referring to FIGS. 1 to 2B, the concept of a method of generating a photograph image according to an embodiment of the present disclosure will be described.

In step 102, a photograph image generating apparatus measures an illumination value. For example, the illumination value can be measured in a preview mode.

Figure 2A:
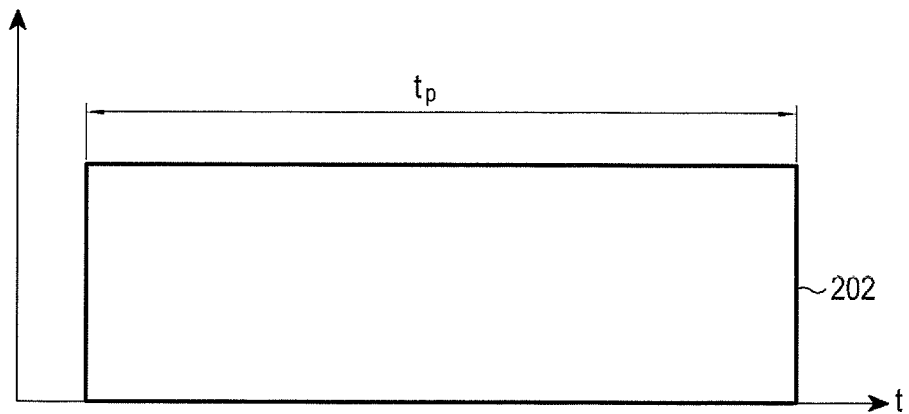
FIGS. 2A and 2B are graphs illustrating, examples of a concept of a method of generating a photograph image according to embodiments of the present disclosure.

In step 104, the photograph image generating apparatus acquires a plurality of source images for generating one final image, i.e., one photograph image. This will be described blow in comparison with the prior art with reference to FIGS. 2A and 2B. FIG. 2A illustrates a conventional method of lengthening an exposure time (tp) in order to generate a photograph image having a brightness similar to the standard brightness in a low illumination environment. According to the conventional method as illustrated in FIG. 2A, the photograph image generating apparatus acquires one source image 202 in order to generate one photograph image in the low illumination environment. This conventional method as described above is problematic in that a blur is generated by the exposure time so as to cause a quality deterioration of the photograph image.

Figure 2B:
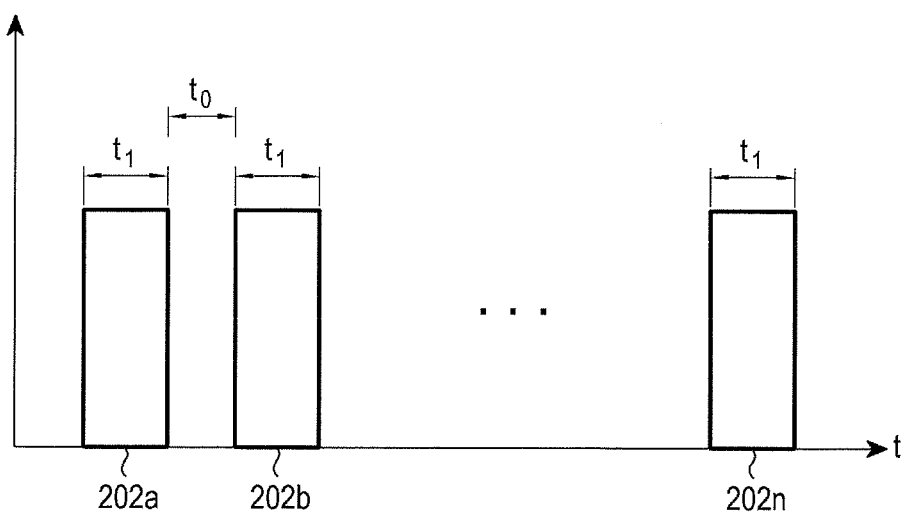

Meanwhile, FIG. 2B illustrates an embodiment of the present disclosure which acquires a plurality of source images 202a to 202n in order to generate one photograph image. That is, in the embodiment of the present disclosure, which is different from the conventional method of acquiring a single source image 202 during a long exposure time ($t_p$), the photograph image generating apparatus acquires a plurality of source images 202a to 202n during a short exposure time ($t_1$) and then generates one photograph image by using the acquired source images. In comparison with the prior art as illustrated in FIG. 2A, a total exposure time can be expressed as $t_p = nt_1 + (n-1)t_0$, wherein $t_1$ refers to an exposure time period for acquiring each source image and $t_0$ refers to a time interval between two exposure time periods. Further, 'n' refers to the number of source images acquired for generating a final image and the numbers of the acquired source images can be different depending on a setting.

In step 106, the photograph image generating apparatus determines whether a correction for the acquired source images is necessary, based on the measured illumination value. Herein, the necessity for the correction can be determined based on the measured illumination value and a first set threshold value. For example, when the measured illumination value is greater than or equal to the first set threshold value, it is determined that the correction is not required. When the measured illumination value is less than the first set threshold value, it is determined that the correction is required. Herein, the first threshold value can be set by considering the exposure time and the gain of the image sensor. For example, an illumination value which can generate a photograph image having a brightness similar to the standard brightness can be configured to be the first threshold value by using a short exposure time and a low image sensor gain supportable by the photograph image generating apparatus.

In step 108, to which the photograph image generating apparatus has proceeded based on a conclusion that the correction is not required as a result of the determination in step 106, the photograph image generating apparatus generates a final image by using one best quality source image among the plurality of source images. Herein, the best quality source image can be the brightest image or an image with the lowest blur among the plurality of acquired source images or be an image with the highest value calculated by applying a set weight to the brightness and the blur, respectively. When one source image to be used to generate the final image has been selected, the photograph image generating apparatus discards all the other source images except for the selected source image.

By the method for generating a photograph image according to step 108, in an the illumination environment in which a photograph image with a sufficient brightness can be acquired, it is possible to acquire a bright and clear image by using only one source image acquired using a short exposure time.

Meanwhile, in step 110, to which the photograph image generating apparatus has proceeded based on a conclusion that the correction is required as a result of the determination of step 106, the photograph image generating apparatus generates a final image, i.e. a photograph image, by combining the plurality of acquired source images. Further, the photograph image generating apparatus performs at least one of a set of corrections at the time of combining the plurality of source images. Herein, the set of corrections includes at least one of a wobbling correction, a noise correction, and a brightness correction. In this event, the brightness correction can be performed only when the illumination level is very low. For example, the brightness correction can be performed only when the measured illumination value is less than the second threshold value that is lower than the first set threshold value.

By the method of generating the photograph image according to step 110, it is possible to acquire a bright and clear image by combining a plurality of source images acquired in a low illumination environment.

The concept of a method of generating a photograph image according to embodiments of the present disclosure has been described above with reference to FIGS. 1 and 2. Hereinafter, a method of generating a photograph image based on an illumination value will be described in more detail with reference to the related drawings.

FIGS. 3A and 3B are graphs illustrating examples of a method of generating a photograph image when the measured illumination value is greater than the first set threshold value.

First, the photograph image generating apparatus measures an illumination value before acquiring, source images. Then, the photograph image generating apparatus acquires source images based on setting, details related to the illumination value. The setting details can be previously mapped and stored with respect to the illumination value. The number of the source images to be acquired in order to generate one final image, that is, a photograph image, can be different depending, on a measured illumination value. For example, as illustrated in FIG. 4, when the measured illumination value is greater than or equal to a first threshold value (10), the number of the source images to be acquired can be configured to be three. Further, when the measured illumination value is less than the first threshold value (10), the number of the source images to be acquired can be configured to be six. Moreover, the case where the measured illumination value is greater than the first threshold value (10) can be divided into sub-cases and the numbers of source images to be acquired can be thus controlled according to the divided sub-cases. For example, when the measured illumination value is greater than or equal to 10 and less than 15, the number of the source images to be acquired can be configured to be three. Further, when the measured illumination value is greater than or equal to 15 and less than 20, the number of the source images to be acquired can be configured to be two.

In addition, the setting details can control a gain of an image sensor and an exposure time related to the illumination value. For example, the setting, details can be configured as illustrated in FIG. 4 in which the lower illumination value is, the higher the gain of the image sensor and the shorter the exposure time are.

FIG. 3B illustrates an example in which three source images 302a, 302b, and 302c are acquired when the measured illumination value is greater than the first threshold value.

In an embodiment of the present disclosure as described above, when the measured illumination value is greater than or equal to the first threshold value, a correction is not performed. When the measured illumination value is greater than or equal to the first threshold value, a wobbling correction is not required because the exposure time is short and a correction for removing a noise is not required because the gain of the image sensor is set to be low.

Therefore, in this event, the photograph image generating apparatus selects one source image 302b having the best quality or the best brightness among the photographed source images, and generates a final image by using the selected source image 302b. Further, the photograph image generating apparatus discards the other source images 302a and 302c which are not selected. The quality of the source image can be determined based on a blur corresponding to each source image. For example, the photograph image generating apparatus can select a source image with the lowest blur after measuring, the blur of each source image. Also, one source image can be selected based on the brightness. For example, the photograph image generating apparatus can select a source image with the highest brightness after measuring, a brightness of each source image. Further, the photograph image generating apparatus can select one source image by considering both the blur and the brightness. For example, as noted from Equation (1) below, the photograph image generating apparatus can select a source image having, the best quality (S) by applying set weights (w1, w2) to the brightness (Y) and the blur (B), respectively.

$$S = Y \times w_1 - B \times w_2 \quad (1)$$

According to the embodiment described with reference to FIGS. 3A and 3B, since the photograph image generating apparatus generates the photograph image by using the short exposure time in a state in which the quantity of light is sufficient, there is no a quality deterioration due to the wobbling and it is possible to generate a bright photograph image. In this event, the gain of the image sensor can be set to be low so that a noise caused by the image sensor can be reduced.

The method of generating the bright and clear photograph image without any correction by using source images acquired in a state in which the quantity of light is sufficient has been described above with references to FIGS. 3A to 4. Hereinafter, a method of generating a photograph image in a low illumination environment will be described in more detail with reference to the related drawings.

Figure 5A:
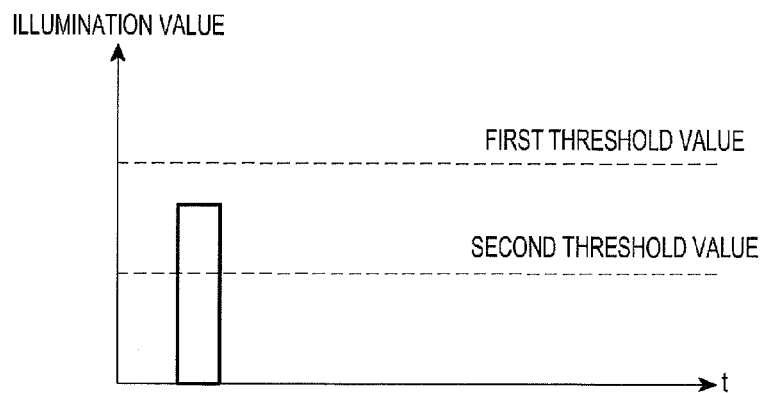
Figure 5B:
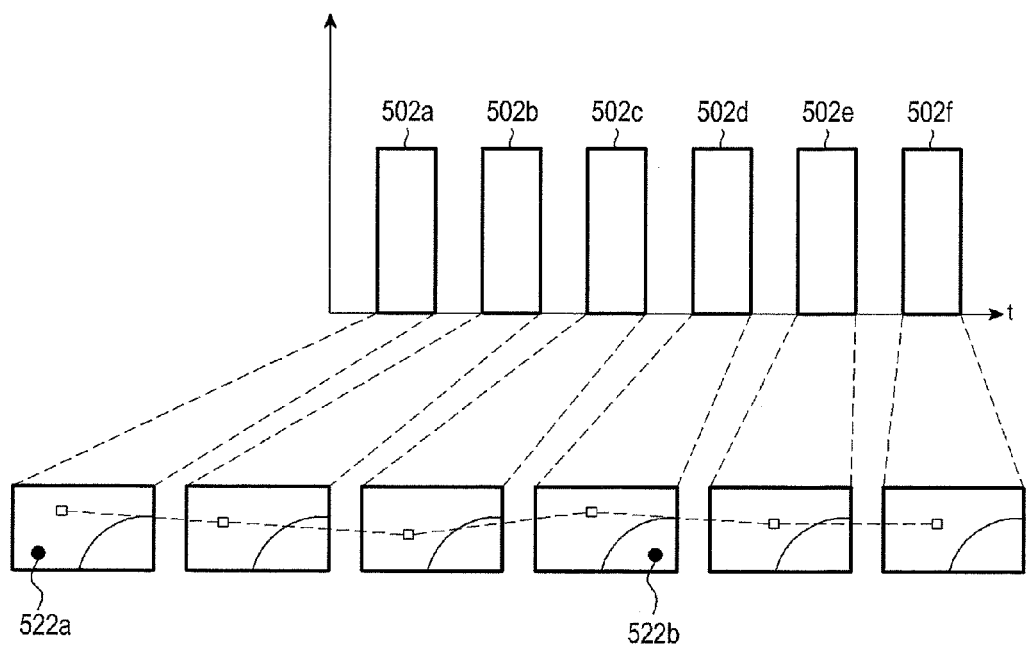

FIGS. 5A and 5B are graphs illustrating examples of a method of generating a photograph image when the measured illumination value is less than the first threshold value.

As illustrated in FIG. 5A, when the measured illumination value is less than the first threshold value, the photograph image generating apparatus acquires source images by referring to the setting detail as illustrated in FIG. 4. For example, the photograph image generating, apparatus can acquire more source images compared to the case in which the measured illumination value is less than the first threshold value, or can acquire source images by increasing the gain of the image sensor or by lengthening the exposure time. FIG. 5B is a graph illustrating an example of acquiring six source images. Herein, it is assumed that the exposure time to acquire each source image is longer than the exposure time in the embodiment described with reference to FIG. 3.

According to an increase of the exposure time, a blur due to a wobbling of the photograph image generating apparatus can occur in each of the source images. Therefore, the photograph image generating apparatus performs a wobbling correction in order to remove the blur.

In order to correct the wobbling, the photograph image generating apparatus identifies an edge area from the plurality of acquired source images, and performs a coordinate correction so as to cause the same edge to be located on the same coordinate. The edge area can be determined through various methods used in the prior art, e.g., methods using an edge detection filter such as a Sobel operator, a Canny edge detector, and a Laplacian, or the like. When the edge area is determined, the photograph image generating apparatus selects one source image having the lowest blur based on a corresponding edge area as a reference image, and then performs a wobbling correction by correcting coordinates of the remaining source images based on the selected image.

On the other hand, when the measured illumination value is less than the first threshold value, setting details for acquiring the source image can regulate to increase the gain of the image sensor. In this event, the noise due to the image sensor can occur in each source image.

The noise can be reduced or removed by combining the plurality of acquired source images. The noise due to the image sensor occurs in random locations 522a and 552b as illustrated in FIG. 5B. Therefore, the noise can be reduced or removed at the time of combining the plurality of source images because pixel values of positions corresponding to each other are averaged when a plurality of source images are combined. For example, as illustrated in FIG. 5B, on an assumption that two noises 522a and 522b have occurred at different locations on two different source images among the six source images, each of the noises 522a and 522b is reduced to ⅙ when the source images are combined.

According to the embodiment of the present disclosure with reference to FIG. 5, it is possible to acquire a clear photograph image by performing wobbling correction for the plurality of source images and then combining the source images.

In addition, even when a photograph is performed with an increased gain of the image sensor, the photograph image generating apparatus can effectively reduce the noise which randomly occurs in each source image, and thus can acquire a clear photograph image in comparison with the conventional method. Therefore, the present disclosure is advantageous in that it is possible to perform photographing by using a high gain which cannot be used in the prior art.

Figure 6:
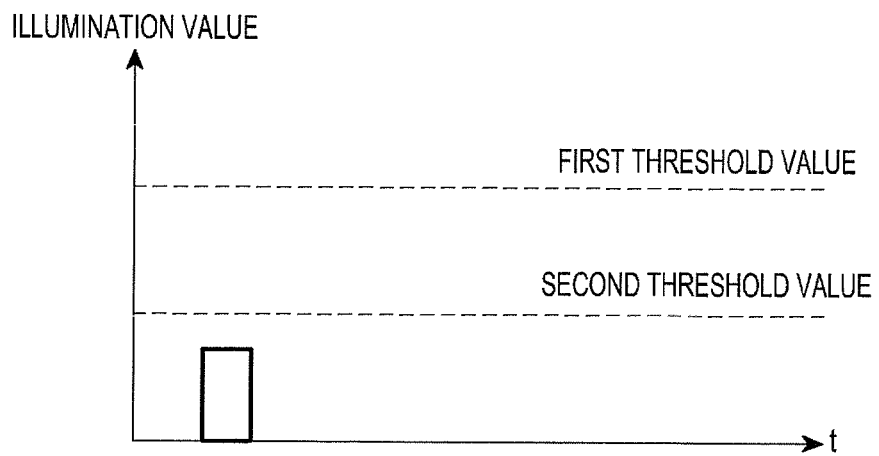

Meanwhile, when the measured illumination value is too low, the brightness correction can be additionally performed, which will be described with reference to FIG. 6. FIG. 6 is a graph illustrating an example of generating a photograph image when the measured illumination value is less than the second threshold value.

As described above, when the measured illumination value is less than the second threshold value, the brightness correction can be performed in order to acquire a brightness similar to a standard brightness. The brightness correction may be performed in addition to at least one correction among the wobbling correction and the noise correction as described above with reference to FIG. 5. According to the embodiment, only the brightness correction may be performed without the wobbling correction and the noise correction.

Various methods such as a histogram equalization, a retinex technique, a contrast stretching technique, or the like may be used in the brightness correction. In addition, the photograph image generating apparatus may acquire a final image, that is, a photograph image with an improved brightness by applying a set weight to each source image and then combining source images. The weight may be applied in order to acquire a brightness similar to the standard brightness, and the weights applied to each source image may be set to be different from each other. For example, among the plurality of acquired source images, the highest weight may be applied to a source image having the lowest blur and the lowest weight be applied to a source image which has the highest blur. An average value of all weights applied to the source images may be determined within the range in which the standard brightness or the brightness similar to the standard brightness can be acquired.

According to the embodiment described with reference to FIG. 6, there is an advantage in that it is possible to generate a bright and clear photograph image even when the measured illumination value is too low.

Figure 7:
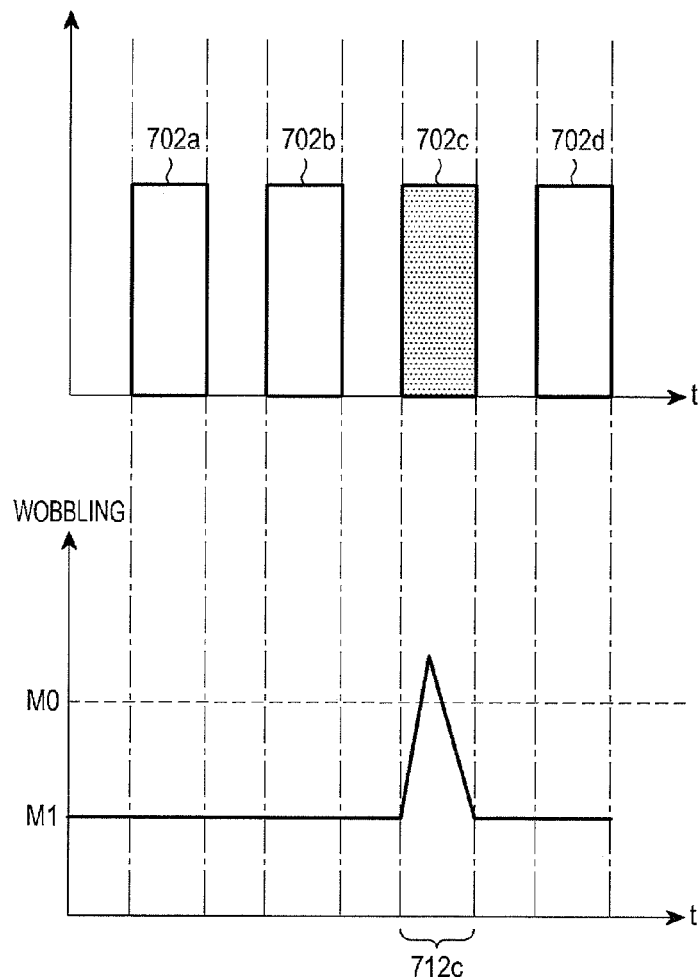

Meanwhile, due to the wobbling of the photograph image generating apparatus, the source image having a serious blur may be acquired during acquiring the source image. Therefore, it is preferable to discard the source image as described above. The wobbling of the photograph image generating apparatus may be measured by using a gyro sensor or an acceleration sensor. For example, as illustrated in FIG. 7, when the measured value M1 for determining the wobbling of the photograph image generating apparatus in one exposure section 712c among exposure sections for acquiring the source image is greater than a set value M0, the photograph image generating apparatus may discard a source image 702c acquired in the corresponding exposure section 712c. Further the photograph image generating apparatus may again acquire as many new source images 702d as the numbers of the discarded source images. According to the one embodiment, the wobbling of the photograph image generating apparatus may be determined whenever each image source is acquired or before determining whether the correction is required after acquiring entire source images.

The method of generating the photograph image according to one embodiments of the present disclosure has been described above with reference to FIGS. 1 to 7. Hereinafter, a photograph image generating apparatus according to embodiments of the present disclosure will be described in more detail with the reference to the related drawings.

Figure 8:
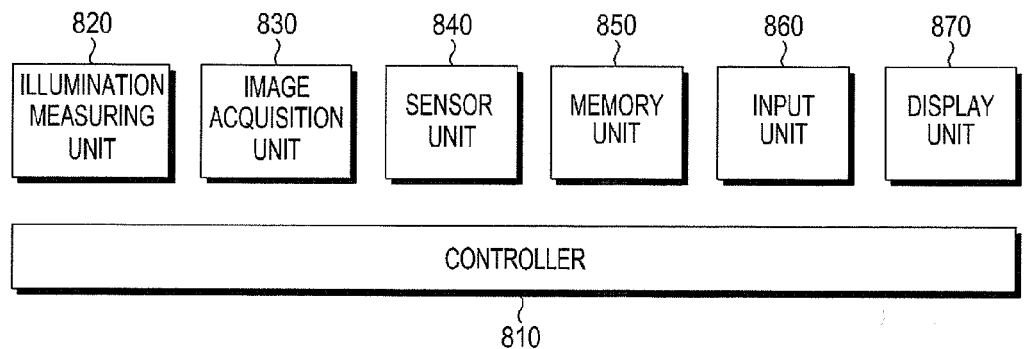
FIG. 8 is a block diagram illustrating an apparatus for generating a photograph image according to embodiments of the present disclosure.

FIG. 8 is a block diagram illustrating a photograph image generating apparatus according to an embodiment of the present disclosure.

Referring to FIG. 8, the photograph image generating apparatus according to an embodiment of the present disclosure includes a controller 810, an illumination measuring unit 820, an image acquisition unit 830, a sensor unit 840, a memory unit 850, an input unit 860, and a display unit 870.

When a signal for a photograph has been input, the controller 810 receives an illumination value from the illumination measuring unit 820 by controlling the illumination measuring unit 820. Further, the controller 810 generates a final image, that is, a photograph image, by selecting one method among the methods of generating the final image set based on the received illumination value and a set threshold value. Herein, the methods of generating the final image includes a first method of generating a final image by using only one source image among a plurality of acquired source images when the measured illumination value is greater than or equal to a first set threshold value, a second method of performing at least one correction of the wobbling correction and the noise correction for a plurality of acquired source images and generating the final image by combining a plurality of source images when the measured illumination value is less than the first set threshold value and greater than or equal to a second set threshold value, and a third method of performing the brightness correction when the measured illumination value is less than the second set threshold value. The third method may include a wobbling correction and a noise correction for the plurality of acquired source images.

When the measured illumination value is greater than or equal to the first threshold value, the controller 810 generates a final image by using one source having the best quality among a plurality of acquired source images. Herein, the source image having the best quality may be a source image having the lowest blur and the highest brightness or may be a source image having a highest value calculated by applying a weight set to the blur and the brightness, respectively.

The controller 810 generates a final image by combining the plurality of acquired source images when the measured illumination value is less than the first set threshold value. In this event, the controller 810 may perform at least one correction of the wobbling correction and the noise correction for the plurality of source images.

The controller 810 generates the final image by combining the plurality of acquired source images when the measured illumination value is less than the second set threshold value. In this event, the controller 810 may perform the brightness correction for the plurality of source images or may perform the brightness correction after the controller 810 combines the plurality of source images. The brightness correction as described above may be performed along with at least one correction of the wobbling correction and the noise correction for the plurality of source images.

Meanwhile, the controller 810 acquires the source image with reference to setting details stored in the memory unit 850. The setting details regulates a standard related to the illumination value. For example, the setting details regulates at least one of the number of source images to be acquired, a gain of the image sensor, and an exposure time in each illumination section. Accordingly, the controller 810 acquires the source image with reference to the illumination value received from the illumination measuring unit 820 and the setting details stored in the memory unit 850.

Meanwhile, the controller 810 determines whether the wobbling of the photograph image generating apparatus has occurred more times than a set value in an exposure section for acquiring each source image whenever each source image is acquired. When it is determined that the wobbling of the photograph image generating apparatus has occurred more times than the set value, the controller may discard the acquired source image in a corresponding exposure section. In this event, the controller 810 may further acquire as many new source images as the number of the discarded source images. The wobbling of the photograph image generating apparatus may be determined based on the sensing information acquired from the sensor unit 840.

On the other hand, the controller 810 may receive a brightness for the final image selected by a user. For example, the user may select an Exposure Value (EV) by operating a menu through the input unit 860. Therefore, the controller 810 may adjust at least one of the number of source images to be acquired, the exposure time and the gain of the sensor image in order to generate the final image based on the selected exposure value. For example, when a low exposure value is selected, the controller 810 may acquire a fewer number of source images. In contrast, when a high exposure value is selected, the controller may acquire a larger number of the source images. The setting details may be stored in the memory unit 850 in a state in which they are mapped to respective exposure values.

The illumination measuring unit 820 measures illumination and then transmits the measured illumination to the controller 810 according to a request from the controller 810.

The image acquisition unit 830 acquires a plurality of source images used to generate one final image under the control of the controller 810.

The sensor unit 840 senses information which can determine the wobbling of the photograph image generating apparatus and then transmits the information to the controller 810. For example, the sensing information may be a slope change information or an acceleration information of the photograph image generating apparatus. Accordingly, the sensor unit 840 may include at least one of a gyro sensor and an acceleration sensor. According to one embodiment, the sensing may be performed in an exposure section for acquiring each source image.

The memory unit 850 stores setting details for generating one final image. For example, the memory unit 850 stores the first threshold value used to determine whether the wobbling correction and the noise correction for the source image are required and the second threshold value used to determine whether the brightness correction is required.

In addition, the memory unit 850, in each illumination section, maps and stores at least one setting detail among a number of the source images to be acquired, the gain of the sensor image, and the exposure time. Further, the memory unit 850 may map and store a setting detail for generating the final image to each exposure value. Also, the memory unit 850 stores the generated final image, that is, the photograph image.

The input unit 860 generates a signal for photograph preparation and commencement according to the request of the user and transmits the generated signal to the controller 810. In addition, the input unit 860 is used to receive an exposure value used to generate the final image.

The display unit 870 outputs an image in a preview mode and displays various guide screens, such as an exposure value selection or the like.

A method of selecting a photograph image generating method through comparison between a measured illumination value and a set threshold value and then generating a photograph image according to the selected method has been described above.

Meanwhile, according to one embodiment, a method of generating a photograph image may be determined based on a measured illumination value. For example, as noted from Table 1 below, a mapping table to which a method of generating a final image corresponding to a predetermined illumination value or an illumination range is mapped may be stored for reference in determination of a final image generating method when an illumination value has been measured at the time of photographing.

TABLE 1

| ILLUMINATION VALUE | FINAL IMAGE GENERATING METHOD |
|---|---|
| MORE THAN 10 | FIRST METHOD |
| 5~10 | SECOND METHOD |
| 0~5 | THIRD METHOD |

The embodiments of the present disclosure as described above may be implemented by various methods. For example, the embodiments of the present disclosure may be implemented by using hardware, software, or a combination of hardware and software. When the embodiments of the present disclosure are implemented as software, it is possible to implement the software as being performed on one more processer using another operating system or a platform. Additionally, the software as described above may be programmed by using any language among a plurality of suitable programming languages and be compiled by an executable machine language code or an intermediate code being performed in a framework or a virtual machine.

Also, when the embodiments of the present disclosure are implemented on one more processer, it may be implemented by a processer-readable mediums (for example, a memory, a floppy disc, a compact disc, an optical disk, and a magnetic tape) in which one more program for performing a method for implementing the various embodiments of the present disclosure as described above are recorded.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of generating a photograph image, the method comprising:
   measuring an illumination value;
   acquiring a plurality of source images used to generate one final image; and
   generating a final image either by using one of selecting one source image with best quality among the plurality of acquired source images or combining the plurality of acquired source images, selected based on the measured illumination value.

2. The method of claim 1, wherein the one source image with best quality is either an image with highest brightness or an image with the lowest blur.

3. The method of claim 2, wherein when the measured illumination is greater than or equal to a first set threshold value, the method generates the final image by selecting one source image with a best quality among the plurality of acquired source images.

4. The method of claim 2, wherein when the measured illumination is less than a first set threshold value, the method generates the final image by combining the plurality of acquired source images.

5. The method of claim 4, wherein the combining the plurality of acquired source images comprises performing at least one of a wobbling correction and a noise correction for the plurality of acquired source images.

6. The method of claim 5, further comprising when the measured illumination value is less than a second threshold value that is smaller than the first threshold value, performing a brightness correction for the plurality of acquired source images.

7. The method of claim 1, wherein acquiring the plurality of source images comprises acquiring the plurality of acquired source images by using an exposure time which decreases as a number of the source images to be acquired increases.

8. The method of claim 1, wherein acquiring the plurality of source images comprises acquiring a fewer number of source images as the measured illumination value increases.

9. The method of claim 1, further comprising:
when each source image is acquired, determining a wobbling degree of the acquired source image and then deleting one or more corresponding source images when the wobbling degree exceeds a set range; and
additionally acquiring as many source images as the deleted source images.

10. The method of claim 9, wherein determining the wobbling is implemented based on sensing information acquired in an exposure section for acquiring each source image.

11. The method of claim 1, further comprising:
receiving a selected exposure value (EV) used to generate the final image; and
determining the number of the source images to be acquired based on the selected exposure value.

12. The method of claim 1, further comprising:
receiving a selected exposure value (EV) used to generate the final image; and
performing the brightness correction for each of the plurality of acquired source images based on the selected exposure value.

13. An apparatus for generating a photograph image, the apparatus comprising:
an illumination measuring unit that measures an illumination value;
an image acquisition unit configured to acquire a plurality of source images used to generate one final image; and
a controller configured to generate a final image either by using one of selecting one source image with best quality among the plurality of acquired source images or combining the plurality of acquired source images, selected based on the measured illumination value.

14. The apparatus of claim 13, wherein the one source image with best quality is either an image with highest brightness or an image with the lowest blur.

15. The apparatus of claim 14, wherein when the measured illumination is greater than or equal to a first set threshold value, the controller is configured to generate the final image by using one source image having the best quality among the plurality of acquired source images.

16. The apparatus of claim 14, wherein, when the measured illumination is less than a first set threshold value, the controller is configured to generate the final image by combining the plurality of acquired source images.

17. The apparatus of claim 16, wherein the controller is configured to perform at least one of a wobbling correction and a noise correction for the plurality of acquired source images.

18. The apparatus of claim 17, wherein, when the measured illumination value is less than a second threshold value that is smaller than the first threshold value, the controller is configured to perform a brightness correction for the plurality of acquired source images.

19. The apparatus of claim 13, wherein the controller is configured to acquire the plurality of acquired source images by using an exposure time which decreases as a number of the source images to be acquired increases.

20. The apparatus of claim 13, wherein the controller is configured to acquire a fewer number of source images as the measured illumination value increases.

21. The apparatus of claim 13, wherein the controller is configured to determine a wobbling degree of the acquired source image whenever each source image is acquired and then delete one or more corresponding source images, and additionally acquire as many source images as the deleted source images when the wobbling degree exceeds a set range.

22. The apparatus of claim 21, further comprising:
a sensor unit configured to output sensing information for determining the wobbling degree,
wherein the controller is configured to determine the wobbling degree based on sensing information received from the sensor unit in an exposure section for acquiring each source image.

23. The apparatus of claim 13, wherein the controller is configure to receive an exposure value (EV) used to generate the final image and determines the number of the source images to be acquired based on the selected exposure value.

24. The apparatus of claim 13, wherein the controller is configured to receive an exposure value (EV) used to generate the final image and performs the brightness correction for each of the plurality of acquired source images based on the selected exposure value.

* * * * *